United States Patent
Tang

(10) Patent No.: US 10,473,322 B2
(45) Date of Patent: *Nov. 12, 2019

(54) MULTIFUNCTION FLASHLIGHT

(71) Applicant: InvenTel Products, LLC, Rockaway, NJ (US)

(72) Inventor: Jack Tang, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/154,401

(22) Filed: Oct. 8, 2018

(65) Prior Publication Data

US 2019/0041054 A1    Feb. 7, 2019

Related U.S. Application Data

(63) Continuation of application No. 15/877,438, filed on Jan. 23, 2018, now Pat. No. 10,125,970, which is a (Continued)

(30) Foreign Application Priority Data

Nov. 3, 2016  (TW) .............................. 105216772 U

(51) Int. Cl.
| | |
|---|---|
| *F21V 21/00* | (2006.01) |
| *F21V 33/00* | (2006.01) |
| *A62B 3/00* | (2006.01) |
| *B25F 1/04* | (2006.01) |
| *B60R 22/32* | (2006.01) |

(Continued)

(52) U.S. Cl.
CPC .......... *F21V 33/0084* (2013.01); *A62B 3/005* (2013.01); *B25F 1/04* (2013.01); *B60R 22/32* (2013.01); *F21L 4/08* (2013.01); *F21V 15/01* (2013.01); *F21V 23/0407* (2013.01); *F21V 23/0414* (2013.01); *F21V 23/0428* (2013.01); *F21V 33/0064* (2013.01); *B60R 2022/328* (2013.01); *F21Y 2113/13* (2016.08); *F21Y 2115/10* (2016.08)

(58) Field of Classification Search
CPC .... F21V 33/084; F21V 15/01; F21V 23/0407; F21V 23/0428; B25F 1/04; A62B 3/005; B60R 22/32; B60R 2022/328; F21L 4/08; F21Y 2113/12; F21Y 2115/10
USPC ................................ 362/120, 208, 187, 253
See application file for complete search history.

(56) References Cited

U.S. PATENT DOCUMENTS

| | | |
|---|---|---|
| 6,454,430 B1 | 9/2002 | Lin |
| 6,592,236 B1 | 7/2003 | Lin |
| (Continued) | | |

FOREIGN PATENT DOCUMENTS

TW           M434157 U1      7/2012

*Primary Examiner* — Laura K Tso
(74) *Attorney, Agent, or Firm* — Jeffrey Lubin, Esq.

(57) ABSTRACT

A multifunction flashlight includes a flashlight body defining opposing front and rear ends, a light source with a LED light mounted in the front end of the flashlight body, a light source switch mounted on the flashlight body near the front end, a focus adjustment device mounted on the flashlight body between the light source and the light source switch, multiple tools pivotally connected to the rear end of the flashlight body and receivable inside the flashlight body, an emergency exit hammer pivotally connected to the rear end of the flashlight body and receivable inside the flashlight body, a release switch mounted on the flashlight body near the rear end, a seat belt cutter, and a USB jack for battery charging.

11 Claims, 4 Drawing Sheets

Related U.S. Application Data continuation of application No. 15/388,176, filed on Dec. 22, 2016, now Pat. No. 9,958,150.

(51) Int. Cl.
*F21L 4/08* (2006.01)
*F21V 15/01* (2006.01)
*F21V 23/04* (2006.01)
F21Y 113/13 (2016.01)
F21Y 115/10 (2016.01)

(56) References Cited

U.S. PATENT DOCUMENTS

| | | |
|---|---|---|
| 6,666,566 B1 | 12/2003 | Uke |
| D494,298 S | 8/2004 | Brent |
| D608,482 S | 1/2010 | Brown |
| D610,727 S | 2/2010 | Nyssen |
| D617,024 S | 6/2010 | Brown |
| D674,946 S | 1/2013 | Bertken |
| D685,510 S | 7/2013 | Henry |
| D699,381 S | 2/2014 | Stewart |
| D716,983 S | 11/2014 | Ma |
| D732,721 S | 6/2015 | Popper |
| D734,885 S | 7/2015 | Brown |
| D748,834 S | 2/2016 | Huang |
| 9,958,150 B1 * | 5/2018 | Tang .................. F21V 23/0428 |
| 10,125,970 B2 * | 11/2018 | Tang .................. F21V 23/0428 |
| 2004/0016058 A1 | 1/2004 | Gardiner |
| 2006/0235329 A1 | 10/2006 | Bhavnani |
| 2006/0256548 A1 | 11/2006 | Wong |
| 2006/0262518 A1 | 11/2006 | Thuma |
| 2010/0085739 A1 | 4/2010 | Webb |

\* cited by examiner

MULTIFUNCTION FLASHLIGHT

CROSS-REFERENCE TO RELATED APPLICATION

This application is a continuation of U.S. patent application Ser. No. 15/877,438 filed on Jan. 23, 2018, which is a continuation of U.S. patent application Ser. No. 15/388,176 filed on Dec. 22, 2016 (now U.S. Pat. No. 9,958,150), which claims priority to Taiwan 105216772 filed on Nov. 3, 2016, the disclosures of each of which are incorporated herein by reference in their entirety.

BACKGROUND OF THE INVENTION

1. Field of the Invention

The present invention relates to lighting technology and more particularly, to a multifunction flashlight.

2. Description of the Related Art

A flashlight is an indispensable lighting device in daily lives. Particularly in the absence of a light source environment, the flashlight is one of the most important lighting tools. Therefore, flashlights are usually stored in the surroundings around people or carried by people for unexpected needs. With the industry's outstanding innovation in flashlight design, different types of flashlights have been continuously created to provide added functions.

Taiwan Patent TWM434157 discloses a Swiss army knife-incorporated flashlight, which is equipped with a Swiss army knife that is receivable in the flashlight. Thus, this design of the flashlight has both the functions of lighting and of a Swiss army knife without increasing the dimension.

However, an ordinary Swiss army knife has a main spearpoint blade, as well as various tools, such as screwdrivers, a can opener, and others. Conventional Swiss knives contain only items that enhance the convenience of everyday life. But the applicant believes that the flashlight is a popular tool; if it can add new items to increase its added value, its application range can be widened, thereby enhancing the industrial value.

SUMMARY OF THE INVENTION

The present invention has been accomplished under the circumstances in view. It is the main objective of the present invention to provide a multifunction flashlight which provides a seat belt cutting function, so that when a traffic accident occurs, and you cannot unbuckle the seat belt lock, you can use the multifunction flashlight to cut off the seat belt for escape.

It is another objective of the present invention to provide a multifunction flashlight which provides a glass door/window breaking function, so that when people are trapped due to the window's inability to be opened, you can use the multifunction flashlight to break the window glass to escape.

To achieve these and other objects of the present invention, a multifunction flashlight comprises a flashlight body defining a front end and an opposing rear end, a light source, a light source switch, a focus adjustment device, a tool set, an emergency exit hammer, a release switch, a seat belt cutter and a USB jack. The light source is mounted in the front end of the flashlight body comprising an LED light. The light source switch is mounted on the flashlight body near the front end and is operable to switch on/off the LED light. The focus adjustment device is mounted on the flashlight body between the light source and the light source switch and is operable to zoom in and out the light beam emitted by the LED light. The tool set is pivotally connected to the rear end of the flashlight body, comprising a small knife, a small scissors, a bottle opener, a flathead screwdriver bit, a Phillips screwdriver bit and a hex wrench. Each of the tools of the tool set are able to be biased in and out of the flashlight body and are receivable inside of the flashlight body. The emergency exit hammer is pivotally connected to the rear end of the flashlight body, and receivable inside the flashlight body. Further, the emergency exit hammer has a pointed tip. The release switch is mounted on the flashlight body near the rear end, and operable to bias the emergency exit hammer, allowing the emergency exit hammer to move the pointed tip out of the flashlight body. The seat belt cutter comprises a profile slot inwardly curved from the periphery of the flashlight body and tilting from front to back, and a cutter blade disposed in the profile slot and spaced below a top open side of the profile slot at a predetermined distance. The USB jack is mounted on the flashlight body for battery charging.

Thus, if you find that the seat belt is wrapped around a person and you cannot unbuckle the seat belt lock, you can use the seat belt cutter to cut off the seat belt so that the trapped person can smoothly turnaround. Further, if people are trapped due to the window's inability to be opened, you can use the emergency exit hammer to break the window glass so that the trapped people can successfully escape.

Other advantages and features of the present invention will be fully understood by reference to the following specification in conjunction with the accompanying drawings, in which like reference signs denote like components of structure.

DETAILED DESCRIPTION OF THE INVENTION

Figure 1:
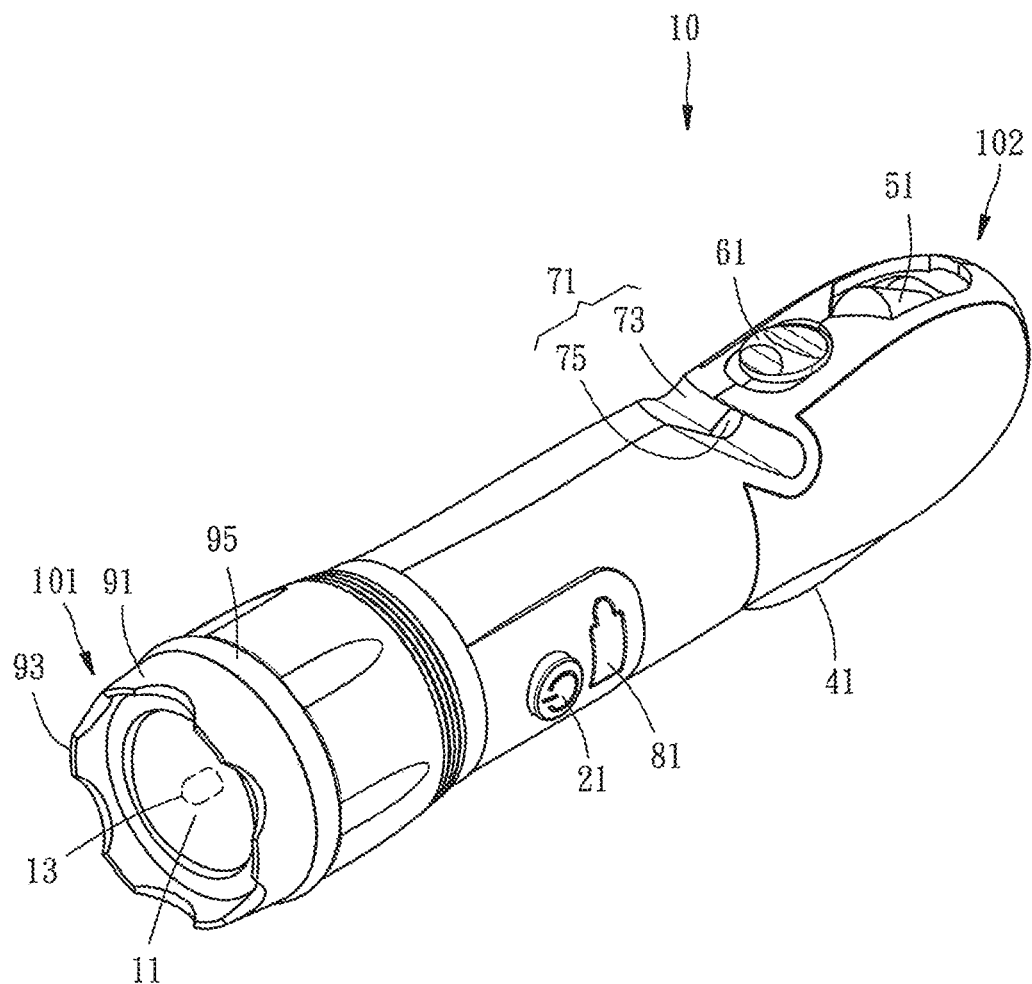
FIG. 1 is an elevational view of a multifunction flashlight in accordance with the present invention.

Referring to FIGS. 1-4, a multifunction flashlight 10 in accordance with the present invention is shown. The multifunction flashlight 10 defines a front end 101 and an opposing rear end 102. Further, the multifunction flashlight 10 comprises a light source 11, a light source switch 21, a focus adjustment device 31, a plurality of tools 41, an emergency exit hammer 51, a release switch 61, a seat belt cutter 71 and a USB jack 81.

The light source 11 is mounted in the front end 101 of the multifunction flashlight 10, comprising an LED light 13. In this embodiment, the LED light 13 is a variable color LED light 13. Further, the LED light 13 is controllable to emit white light for the purpose of illumination, or red light for the purpose of warning. Further, when the LED light 13 is controlled to emit red light, the red light is emitted in a flashing manner (not shown).

The light source switch 21 is mounted on the body of the multifunction flashlight 10 near the front end 101, thereby allowing the user to conveniently operate when holding the multifunction flashlight 10. The light source switch 21 is operable to switch on/off the LED light 13. Since the LED light 13 in the present preferred embodiment is a variable color LED light, the light source switch 21 can also switch the LED light 13 between a white light mode and a red-light mode. Further, the light source switch 21 is a multi-step push button switch. However, this multi-step push button configuration is not a limitation. Another configuration, such as a rotary switch, can be used as a substitute. The focus adjustment device 31 is mounted on the body of the multifunction flashlight 10 between the light source 11 and the light source switch 21, and operable to zoom in or out the light beam of the LED light 13. In the present preferred embodiment, when the focus adjustment device 31 is pulled backwards, the light beam of the LED light 13 is shifted from a concentrated mode to a scattered mode; on the contrary, when the focus adjustment device 31 is pushed forwards, the light beam of the LED light 13 is shifted from the scattered mode to the concentrated mode.

The multiple tools 41 are respectively pivotally connected to the rear end 102 of the multifunction flashlight 10. The multiple tools 41 include a small knife 42, a small scissors 43, a bottle opener 44, a flathead screwdriver bit 45, a Phillips screwdriver bit 46 and a hex wrench 47. Each tool 41 can be biased and received in the multifunction flashlight 10.

The emergency exit hammer 51 has a pointed tip 53. Further, the emergency exit hammer 51 is pivotally connected to the rear end 102 of the multifunction flashlight 10 and can be biased and received inside the multifunction flashlight 10. In the present preferred embodiment, the tools 41 and the emergency exit hammer 51 are arranged back to back.

The release switch 61 is mounted on the body of the multifunction flashlight 10 near the rear end 102, thereby allowing the user to conveniently operate when holding the multifunction flashlight 10. Triggering the release switch 61 can bias the emergency exit hammer 51 to move the pointed tip 53 out of the multifunction flashlight 10. In the present preferred embodiment, the release switch 61 is of a push button design, however, this push button design is not a limitation. Other designs, such as the DIP switch design can be used as a substitute.

The seat belt cutter 71 comprises a profile slot 73 and a cutter blade 75. The profile slot 73 curves inward from the surface of the body of the multifunction flashlight 10 and tilts from front to back. The cutter blade 75 is mounted in the profile slot 73. Further, the cutter blade 75 is spaced below the top open side of the profile slot 73 at a predetermined distance. In the present preferred embodiment, the seat belt cutter 71 is disposed near the rear end 102 of the multifunction flashlight 10.

The USB jack 81 is mounted on the body of the multifunction flashlight 10. Further, in the present preferred embodiment, the USB jack 81 is a power jack for battery charging (since the battery in the present preferred embodiment is a rechargeable power storage device of the common technology, it is not shown in the drawings). Thus, the multifunction flashlight 10 can be charged with an external power source.

The multifunction flashlight 10 further comprises a protective shell 91 attached to the front end 101 of the multifunction flashlight 10. The protective shell 91 has a plurality of protruding portions 93 equiangularly spaced around a top edge thereof. The protective shell 91 is adapted for protecting the light source 11 against the impact of an external glass or other hard objects. The protruding portions 93 can be used as foot members of the protective shell 91 to support the multifunction flashlight 10 on a planar surface (flooring surface or tabletop) in an erect position. In addition to the advantage of being easy to take, the multifunction flashlight 10 in the erect position is less susceptible to displacement upon a slight vibration, avoiding resulting in lossor damage.

However, if the light source 11 will not be impacted when you use the multifunction flashlight 10, the protective shell 91 can be eliminated. Therefore, the protective shell 91 is not a requisite component. However, without mounting the protective shell 91 at the front end 101 of the multifunction flashlight 10, you cannot use the protective shell 91 as a seat for the multifunction flashlight 10.

The multifunction flashlight 10 further comprises a light transmissive ring 95. The light transmissive ring 95 is mounted on the body of the multifunction flashlight 10 in the front end 101. If the multifunction flashlight 10 is equipped with the protective shell 91 and the LED light 13 is controlled to emit a red warning light, the user can use the protruding portions 93 of the protective shell 91 as seat means to support the multifunction flashlight 10 on the floor in an erect position, enabling the emitted red warning light to go through the light transmissive ring 95 toward the outside, avoiding significant reduction of the red light transmittance due to the downward facing position of the LED light 13. Therefore, the arrangement of the light transmissive ring 95 greatly increases the overall light transmission area of the multifunction flashlight 10. If it is not necessary to increase the light transmission area, the light transmissive ring 95 can be eliminated. Therefore, the light transmissive ring 95 is not a requisite component.

After understanding the structural details of the present invention, the application of the multifunction flashlight 10 is explained hereinafter.

Figure 2:
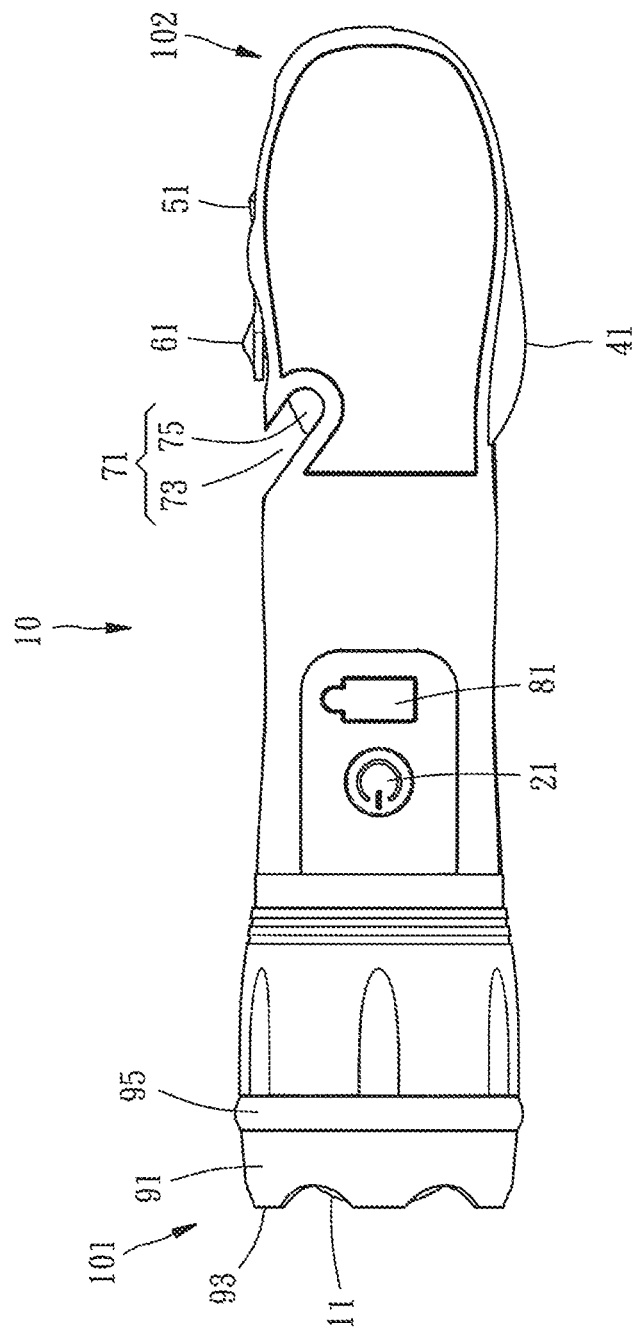
FIG. 2 is a side view of the multifunction flashlight in accordance with the present invention.
Figure 3:
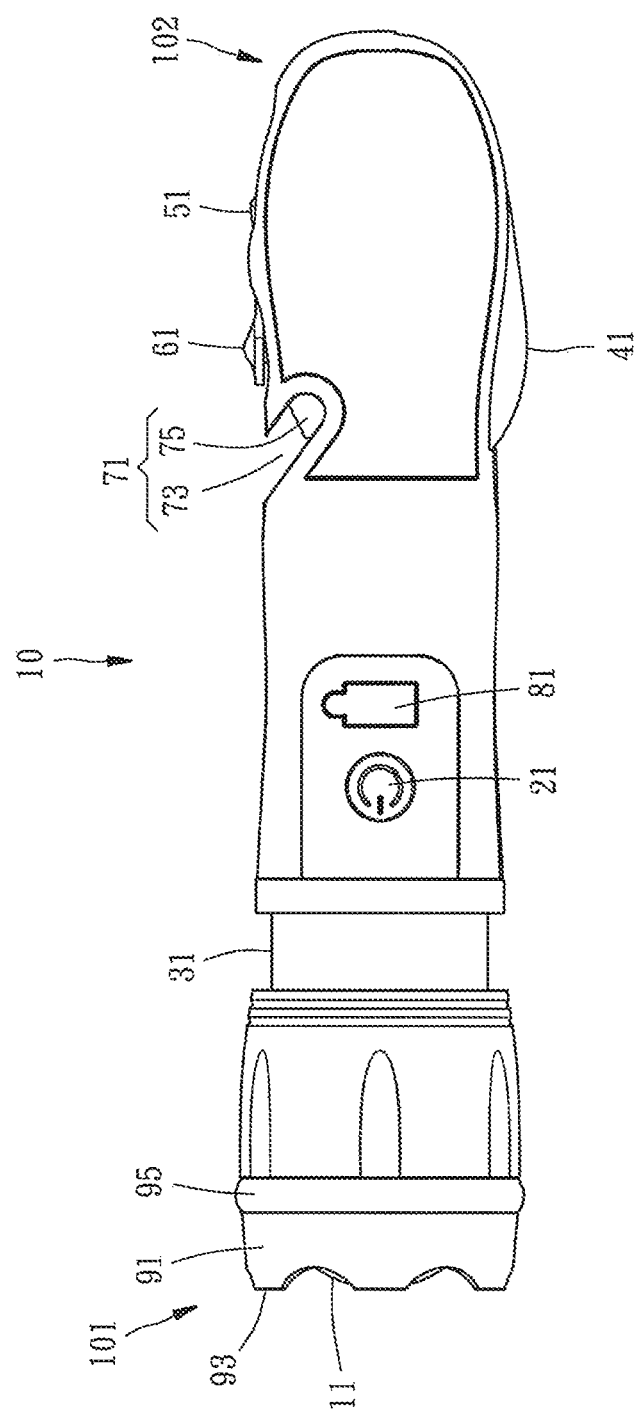
FIG. 3 is a schematic applied view of the present invention, illustrating focus adjustment device extended out.

Referring to FIGS. 1-3, when using the multifunction flashlight 10 for illumination, hold the body of the multifunction flashlight 10 with one hand and press the light source switch 21 to switch on the LED light 13, driving the LED light 13 to emit white light for illumination. At this time, you can pull the focus adjustment device 31 forward or backward to zoom in or out, adjusting the lighting range. Thereafter, you can press the light source switch 21 to shift the LED light 13 from the white light mode to the red-light mode for warning if desired. When you press the light source switch 21 again, the LED light 13 will be shifted from the red-light mode back to the white light mode. If you press the light source switch 21 again, the LED light 13 is immediately returned to OFF state.

When using the multifunction flashlight 10 for cutting off a seat belt, insert the seat belt into the profile slot 73, and then pull the seat belt against the cutter blade 75 in the direction away from the profile slot 73. At this time, the cut part of the seat belt will be moved out of the profile slot 73. This procedure is repeated again and again until the seat belt is completely cut off, thereby avoiding the situation in which the person is trapped by the seat belt and cannot smoothly turnaround.

Figure 4:
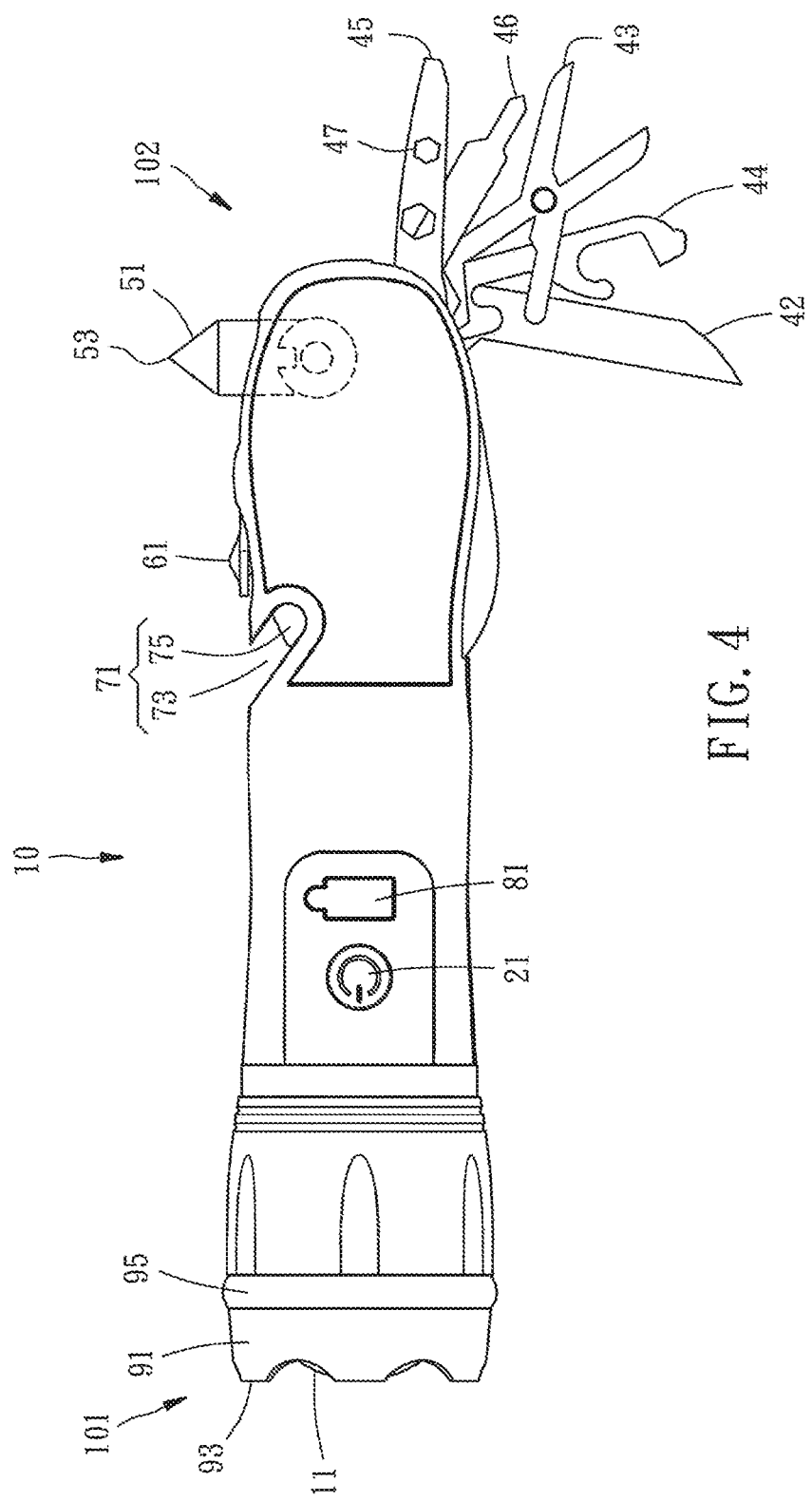
FIG. 4 is another schematic applied view of the present invention, illustrating the emergency exit hammer and the multiple tools biased out of the multifunction flashlight.

Referring to FIGS. 1, 2 and 4, when using the multifunction flashlight 10 for breaking glass, press the release switch 61 to release the emergency exit hammer 51, enabling the emergency exit hammer 51 to bias the pointed tip 53 toward the outside of the multifunction flashlight 10, and then apply pressure to the emergency exit hammer 51 to strike the pointed tip 53 of the emergency exit hammer 51 against the glass, thereby breaking the glass. After the usage, push the emergency exit hammer 51 back into the inside of the multifunction flashlight 10 by hand.

When using the multiple tools 41, you can turn the selected tool 41 toward the outside of the multifunction flashlight 10. After the usage, you can turn back the selected tool 41 and receive it in the multifunction flashlight 10.

Thus, if you find that the seat belt is wrapped around a person and you cannot unbuckle the seat belt lock, you can use the seat belt cutter 71 to cut off the seat belt so that the trapped person can smoothly turnaround.

Further, if people are trapped due to the window's inability to be opened, you can use the emergency exit hammer 51 to break the window glass so that the trapped people can successfully escape.

What is claimed is:

1. A multifunction flashlight, comprising:
   a flashlight body defining a front end and an opposing rear end;
   a light source mounted in said front end of said flashlight body, said light source comprising a LED light;
   a light source switch mounted on said flashlight body near said front end and operable to switch on/off said LED light;
   a focus adjustment device mounted on said flashlight body between said light source and said light source switch and operable to zoom in and out the light beam emitted by said LED light;
   a tool set pivotally connected to said rear end of said flashlight body, said tool set comprising at least one tool, wherein said at least one said tool being biasable in and out of said flashlight body and receivable inside said flashlight body;
   an emergency exit hammer pivotally connected to said rear end of said flashlight body and receivable inside said flashlight body, said emergency exit hammer having a pointed tip; and
   a release switch mounted on said flashlight body near said rear end and operable to bias said emergency exit hammer for causing said emergency hammer to move said pointed tip out of said flashlight body.

2. The multifunction flashlight as claimed in claim 1, wherein at least one tool of said tool set is selected from the group consisting of: knife, a scissors, a bottle opener, a flathead screwdriver bit, a cross-recess screwdriver bit, and a hex wrench.

3. The multifunction flashlight as claimed in claim 1, wherein said tool set and said emergency exit hammer are arranged back to back.

4. The multifunction flashlight as claimed in claim 1, further comprising a cutter having a profile slot inwardly curved from the periphery of said flashlight body and tilting from front to back, and a cutter blade disposed in said profile slot and spaced below a top open side of said profile slot as a predetermined distance.

5. The multifunction flashlight as claimed in claim 4, wherein said cutter is disposed near said rear end of said flashlight body.

6. The multifunction flashlight as claimed in claim 1, further comprising a protective shell mounted on said front end of said flashlight, said protective shell comprising a plurality of protruding portions equiangularly spaced around a top edge thereof.

7. The multifunction flashlight as claimed in claim 6, further comprising a light transmissive ring mounted on said flashlight body at said front end.

8. The multifunction flashlight as claimed in claim 1, wherein said LED light is a variable color LED light.

9. The multifunction flashlight as claimed in claim 8, wherein said LED light is selectively controllable to emit white light or red light.

10. The multifunction flashlight as claimed in claim 1, further comprising a USB jack mounted on said flashlight body for battery charging.

11. The multifunction flashlight as claimed in claim 8, wherein said LED light is controlled to emit said red light in a flashing mode.

* * * * *